M. LÉCUYER.
FLYING MACHINE.
APPLICATION FILED JULY 27, 1917.

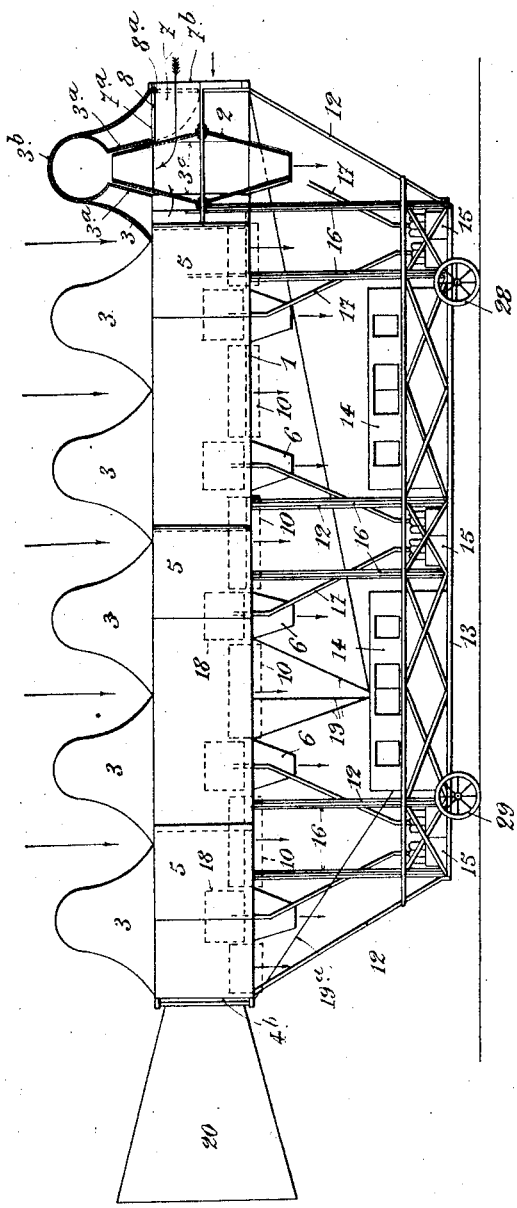

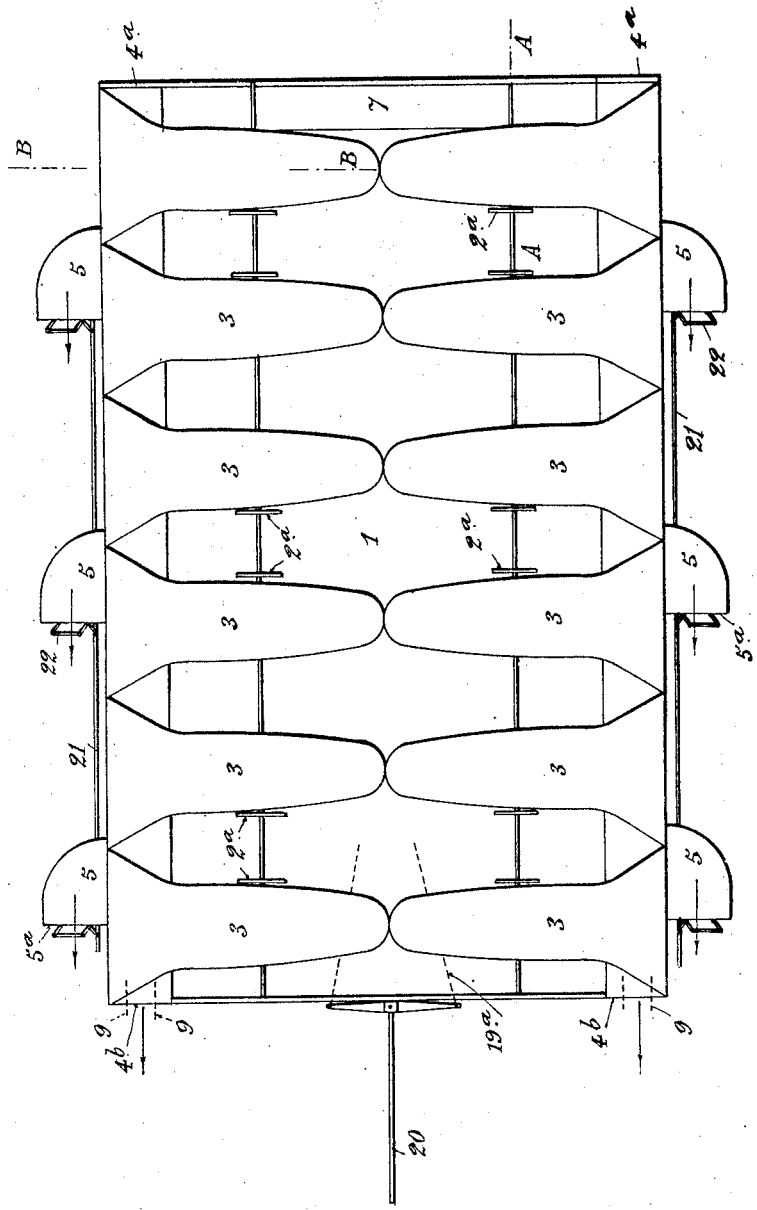

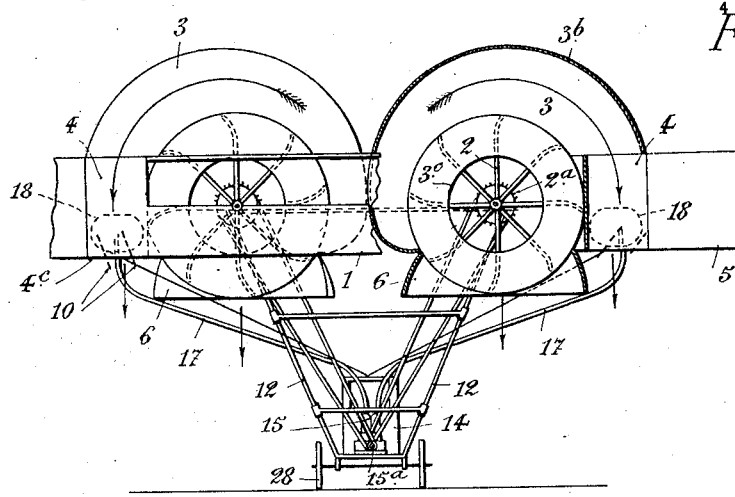
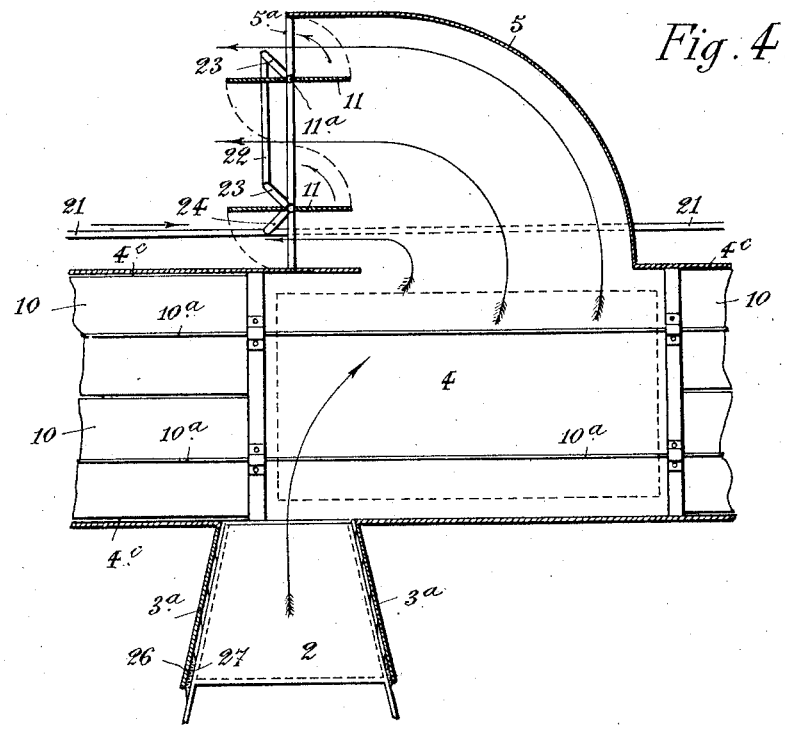

1,332,129.

Patented Feb. 24, 1920.
4 SHEETS—SHEET 4.

INVENTOR
Maurice Lécuyer
BY
ATTORNEYS

UNITED STATES PATENT OFFICE.

MAURICE LÉCUYER, OF VILLERS-COTTERETS, FRANCE.

FLYING-MACHINE.

1,332,129.  Specification of Letters Patent.  Patented Feb. 24, 1920.

Application filed July 27, 1917. Serial No. 183,075.

*To all whom it may concern:*

Be it known that I, MAURICE LÉCUYER, a citizen of the Republic of France, residing at Villers-Cotterets, Aisne Department, Place du Marché, in the Republic of France, machinist, have invented certain new and useful Improvements in Flying-Machines, of which the following is a specification.

This invention relates to flying machines of the kind in which a supporting surface carries suitable apparatus for drawing in and discharging air, and means for directing the currents of air produced by the said apparatus downward, upward, or rearward for the purpose of causing the ascent, descent, or propulsion of the flying machine as required.

According to the invention the apparatus for drawing in and discharging air consists of fans with vanes or blades, the axes of rotation of which are arranged horizontally along one or more pairs of longitudinal lines, half of the fans revolving in one direction and the other half in the opposite direction.

The suction of each fan is effected through louvers placed above the supporting surface. The suction, particularly for fans placed in front of the machine, takes place through a nozzle placed in front of their center, the said nozzle having an upper aperture and a forward aperture and being provided with a shutter which allows of obstructing these apertures alternately according to whether the entering current of air is to be directed rearward or downward.

On the other hand, the discharge of each fan is effected in a longitudinal passage which is common to the series of fans placed along the same line, the said passage being closed in front, open at the back and provided with apertures directed downward and with a series of lateral curved nozzles which open rearward, and the mouths of the said passage and of the said nozzles being provided with valves allowing of partially or completely closing them.

The casing of each fan has, moreover, at its lower part a downwardly directed opening through which a portion of the air discharged by the vanes can escape in order to cause the lifting or elevation of the machine.

Owing to the relatively large number of air inlet and outlet openings above and below as well as at the rear, and to the independence of their means of regulation it is possible, in all circumstances, to insure the stability and precise direction of the flying machine thus constructed.

The invention also comprises various details which will be hereinafter described.

The accompanying drawing shows, by way of example, a form of construction of flying machine according to the invention.

Figure 1 is a side elevation, the front part being seen in vertical section on the line A—A, Fig. 2.

Fig. 2 is a plan of the machine.

Fig. 3 is a front elevation of the same part being seen in vertical section on the line B—B, Fig. 2.

Fig. 4 is a horizontal section, drawn to a larger scale, of a portion of one of the lateral air-discharge conduits.

Figure 5:
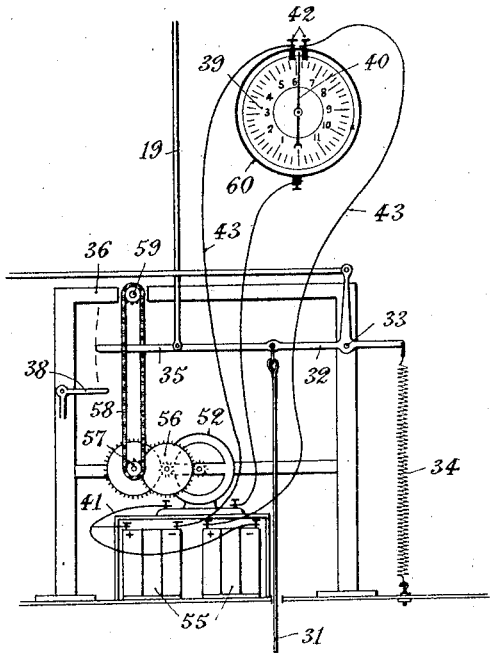
Fig. 5 illustrates an arrangement for the automatic regulation of altitude.
Figure 6:
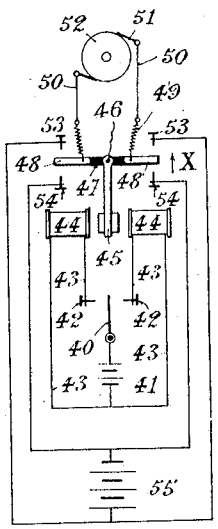
Fig. 6 is a diagrammatic view of the connections of this arrangement.

1 indicates a rectangular supporting surface formed, for example, of an impermeable fabric stretched over a rigid frame (not shown). Upon this surface are carried, for example, 12 compressor-fans arranged in two longitudinal rows, each fan comprising a vane wheel 2 and a casing 3. The latter is provided with lateral conical cheeks $3^a$ and a peripheral sheath $3^b$ of spiral shape. The cheeks $3^a$ have central openings or louvers $3^c$ placed above the surface 1 and the sheath $3^b$ has its narrow end adjacent to this surface, while its wider end opens into the top of a passage 4 which extends along the longitudinal edge of the surface 1.

Each passage 4 is closed in front at $4^a$ and open at the back at $4^b$. Its bottom is provided with openings $4^c$ and its outer side is provided with lateral nozzles 5 which are curved and open toward the rear at $5^a$. The lower part of each casing 3 is provided with a downwardly directed aperture 6.

When the vane wheels 2 are rotated, air is drawn in through the louvers $3^c$ and a portion is forced directly into the nozzles 6 and a portion into the passages 4, whence it escapes through the lower openings $4^c$ and through the rear openings $4^b$ and $5^a$ of the passage 4 and nozzles 5.

In front of the forward louvers of the front fans is a transverse nozzle 7 having an opening $7^a$ at the top and an opening $7^b$ in front. These openings can be alternately closed by a valve 8 rocking upon a spindle $8^a$.

On the other hand the openings $4^b$, $4^c$, $5^a$, are provided with valves 9, 10, 11 respectively, which rock upon spindles $9^a$, $10^a$, $11^a$ and which allow of regulating the outlet of the air through these openings.

Beneath the surface 1 is suspended by means of rods 12, a platform 13 supporting cabins 14 for the pilots and the passengers, and combustion engines 15. These latter actuate the vane wheels 2 by means of chains (not shown) passing through tubes 16 and around toothed wheels $2^a$ and $15^a$, in such a manner that the wheels 2 revolve in opposite directions.

The engines carry tubes 17 which conduct the exhaust gases into cages 18 of fine wire gauze placed in the passages 4.

19 indicate cords extending into one of the cabins 14 and serving to actuate the different valves 8, 9, 10, 11; $19^a$ indicate cords serving to actuate the steering rudder 20 placed at the rear of the surface 1.

Fig. 4 shows a movable rod 21 serving to steady the movements of the different valves 11. The latter are arranged in pairs and the two valves of each pair are connected by means of a transverse rod 22 and crank handles 23 so that it is only necessary to connect one of these two halves to the rod 21 by a crank handle 24 in order to move them both together.

The toothed wheels $2^a$ are mounted after the manner of the free wheels of bicycles in order that the wheels 2 shall be moved only in the proper direction.

Rings 26, 27 fixed respectively to the wheels 2 and to the cheeks $3^a$ are arranged in such a manner as to oppose the return of the compressed air from the sheaths $3^b$ toward the louvers $3^c$.

The platform 13 is mounted upon two pairs of wheels 28, 29, the front pair 28 of which can rock to the right and left as in a motor car.

The operation is as follows:—

By reason of the rotation of the vane wheels 2, the outer air is drawn through the louvers $3^c$ and forced partly through the lower apertures 6 and partly through the sheaths $3^b$ and the passages 4, whence it escapes through the openings $4^b$, $4^c$ and $5^a$. A rarefaction above the surface 1 and a compression below consequently take place whence results the ascensional force which causes the machine to rise. Moreover, the air which escapes rearwardly causes a forward propulsive re-action. The operation of the valve 8 allows of producing the suction in front of the machine either downwardly to increase the ascensional force or rearwardly to increase the propulsive force.

On the other hand the operation of the different valves 9, 10, 11 allows of varying the quantity of air delivered downward and rearward, and consequently also of regulating the ascensional and propulsive forces. The propulsive force can, if required, be completely dispensed with; the machine then rises vertically.

The passages 4, which have a relatively large area, serve to equalize the pressure of the discharged air and to compensate, to a certain extent, for the differences of efficiency of the various compressor-fans.

The efficiency of the machine is, besides, increased by the addition to the discharged air of the exhaust gases from the engines and by the expansion produced under the influence of the heat of the said gases.

The wire gauze cages 18 prevent any risk of fire by the said gases.

The direction of the machine can be effected either by means of the rudder 20 or by means of the valves 9 and 11, which allow of producing a propulsive force less on one side than on the other, or by both these means together.

The mounting of the pinions $2^a$ upon the wheels 2 allows the latter to continue to turn when their respective engines have stopped. This arrangement avoids the stoppage of one engine preventing the rotation of all the fans.

The arrangement represented in Fig. 5 allows the apparatus to remain stationary in the air above a given point over which the anchor has been cast. To this end the anchor cord 31 is attached by its upper end to a lever 32 movable around a pivot 33 and kept raised by a spring 34, the tension of which is regulated so as to exceed the weight of the cord and anchor. At the end 35 of the lever 32 abutting when at rest against a bracket 36 is connected the cord 19 which controls the ascension valves 10. The anchor having gripped, the valves 10 close when the lever 32 is lowered by reason of the tension exerted upon it when the apparatus tends to further rise and to open when the apparatus descends beyond the desired point. If the action of the valves is insufficient and if the apparatus still rises, notwithstanding their complete closure, the end of the lever 32 still lowering, acts upon a handle 38 adapted to regulate the speed of the engines and reduces the latter to the necessary degree.

By replacing the anchor by a simple guide rope, the weight of which is sufficient to overcome the tension of the counteracting spring 34 of the lever 32, an arrangement is obtained which allows of navigating at a height automatically constant and equal to the length of cord which will equilibrate the spring 34.

The arrangement represented in Fig. 5 also allows the machine to remain automatically at any altitude either stationary or in progress, and that without the aid of anchor or guide rope. The regulation is obtained by means of an aneroid barometer 39, the hand 40 of which is connected to one of the poles of a battery 41 and rocks between two contact screws 42 which are connected to the other pole of the battery 41 by conductors 43. In these conductors are interposed two relay electro-magnets 44 acting in opposite directions upon an armature 45 which rocks upon a shaft 46; to this armature is fixed an insulating arm 47 carrying two metal strips 48 which are connected by springs 49 and conductors 50 to the brushes 51 of an electric motor 52; each of these strips 48 oscillates between two screws 53 and 54 respectively connected to the two poles of a battery of accumulators 55.

The motor 52 actuates, through the medium of reducing gear 56, a chain pinion 57 around which passes an endless chain 58 which also passes around a secondary pinion 59. A link of this chain is attached to the lever 32.

The contact screws 42 are mounted upon a ring 60, the position of which is regulated so that when the machine is at the desired altitude the hand 40 does not touch either of the screws.

If the machine begins to rise the hand 40 touches, for example, the right hand screw 42 and closes the circuit of the corresponding electro-magnet 44, which causes the commutator arrangement 45, 47, 48 to rock in the direction of the arrow X; the current of the battery then circulates in the motor in a corresponding direction. The chain 58 is thus actuated in the direction of the lowering of the lever 32 whence results the closing of the valves 10 and, consequently, the return of the machine to the desired altitude.

On the other hand, if the machine descends below this altitude the hand 40 will close the left hand circuit 43 so that the commutator will be actuated in the opposite direction to the arrow X, which will reverse the current of the battery through the motor. Consequently, the lever 32 will rise, the valves 10 will open and the machine will rise to the desired altitude.

It is to be understood that the constructive arrangements described and represented are only given by way of example and can be replaced by any equivalent arrangements for the proposed purpose without the essential characteristics of the invention being altered.

Having now particularly described and ascertained the nature of my said invention, and in what manner the same is to be performed, I declare that what I claim is:

1. A flying machine comprising in combination a supporting surface, several compressor-fans, the suction louvers of which are placed above the said surface, longitudinal passages on the said surface having discharge apertures in their under sides and at their rear ends, discharge nozzles extending from the said passages and opening toward the rear, the casing of the said fans opening into the said passages and each having a downwardly directed discharge aperture beneath the said supporting surface, and means for regulating the outlet of the air through the said nozzles.

2. A flying machine comprising in combination a supporting surface, several compressor-fans, the suction louvers of which are placed above the said surface, the said fans being arranged in longitudinal rows, a transverse nozzle placed at the front of the supporting surface, into which open the suction louvers of the forward fans, the said nozzle having apertures in its top and in its front, and means for alternately closing the said apertures.

3. A flying machine comprising in combination a supporting surface, compressor-fans upon the said surface, longitudinal passages on the said surface fed by the said fans and having downwardly and rearwardly discharging apertures, a platform suspended from the supporting surface, combustion engines upon the said platform, and pipes for conducting the exhaust gases from the said engines into the said longitudinal passages.

4. A flying machine comprising in combination a supporting surface, longitudinal shafts upon the said surface, several compressor-fans upon each of the said shafts, longitudinal passages upon the said surface fed by the said fans and having downwardly and rearwardly discharging apertures, a platform suspended from the supporting surface, engines upon the said platform and transmission means between the engines and the fan-shafts, the said transmission means comprising free wheels whereby the stoppage of one of the engines is prevented from affecting the other engines connected to the same shaft.

5. A flying machine comprising a supporting surface, means for drawing in air above the said surface and discharging it downward, valves adapted to regulate the outlet for the downwardly forced air, a lever for controlling the said valves, a cord suspended from the said lever in such a manner that its traction causes the said lever to rock in the direction of the closure of the said valves and a spring acting upon the said lever in the reverse direction to the traction of the said cord.

6. A flying machine comprising a supporting surface, means for drawing in air above the said surface and discharging it downward, valves adapted to regulate the outlet of the downwardly discharged air, a lever for controlling the said valves, a reversible-action electric motor adapted to move the said lever, a battery, a commutator arrangement adapted to reverse the current of the battery through the motor, an aneroid barometer and means for controlling the said commutator arrangement actuated by the said barometer under the influence of the variations of altitude, substantially as described and for the purpose proposed.

In testimony, that I claim the foregoing as my invention I have signed my name in presence of two subscribing witnesses.

MAURICE LÉCUYER.

Witnesses:
CHARLES BAUDRY,
CHAS. P. PRESSLY.